United States Patent [19]

Okabe et al.

[11] Patent Number: 4,960,849

[45] Date of Patent: Oct. 2, 1990

[54] POLYURETHANE FROM A COPOLYETHER OF TETRAHYDROFURAN AND 3-ALKYL TETRAHYDROFURAN

[75] Inventors: Kazuaki Okabe, Kitasaitama; Hideyuki Ishii, Yokosuka; Haruo Watanabe, Tokyo; Shuichi Takeuchi, Tokyo, all of Japan

[73] Assignee: Hodogaya Chemical Co., Ltd., Tokyo, Japan

[21] Appl. No.: 172,574

[22] Filed: Mar. 24, 1988

[30] Foreign Application Priority Data

Mar. 25, 1987 [JP] Japan .................................. 62-68764

[51] Int. Cl.$^5$ .............................................. C08G 18/32
[52] U.S. Cl. ......................................... 528/76; 528/61; 528/65; 528/73
[58] Field of Search ....................... 528/73, 76, 61, 65

[56] References Cited

U.S. PATENT DOCUMENTS

| | | | |
|---|---|---|---|
| 3,358,042 | 12/1967 | Dunlap et al. | 568/617 |
| 3,726,905 | 7/1971 | Coates et al. | 549/509 |
| 3,859,369 | 1/1975 | Copelin | 568/363 |
| 4,120,850 | 10/1978 | Pechhold | 528/66 |
| 4,194,035 | 3/1980 | Dieterich | 528/67 |
| 4,590,285 | 5/1986 | Ernst | 549/509 |
| 4,739,027 | 4/1988 | Mendelsohn et al. | 528/76 |

FOREIGN PATENT DOCUMENTS

| | | | |
|---|---|---|---|
| 3324960 | 5/1984 | Fed. Rep. of Germany | 528/73 |
| 2134765 | 12/1972 | France | 528/73 |
| 39-26002 | 11/1964 | Japan | 528/73 |
| 58-189221 | 11/1983 | Japan | 528/73 |

Primary Examiner—John Kight, III
Assistant Examiner—Dennis R. Daley
Attorney, Agent, or Firm—Cushman, Darby & Cushman

[57] ABSTRACT

A polyurethane resin composition without handling trouble is obtained by a combination of a copolyether polyol obtained by copolymerization of tetrahydrofuran and a 3-alkyl tetrahydrofuran at a mixing molar ratio of 85/15-20/80, a polyisocyanate compound and an active hydrogen atom-containing compound. The 3-alkyl tetrahydrofuran is preferably 3-methyl tetrahydrofuran.

14 Claims, No Drawings

POLYURETHANE FROM A COPOLYETHER OF TETRAHYDROFURAN AND 3-ALKYL TETRAHYDROFURAN

The present invention relates to a polyurethane resin composition.

Polyethers are widely used as soft segment components of polyurethane resins, and among them, polytetramethylene ether glycols are especially noticed as the soft segment component because of their furnishing polyurethane resins with superior elastic characteristics, low-temperature characteristics and hydrolytic resistance.

The polytetramethylene ether glycols, polymers of tetrahydrofuran ("THF"), usable for polyurethane resins have molecular weights of 500-4000 and melting points of 20-40° C. Accordingly, they crystallize at room temperature or lower, and thus have problems not only in handling and workability but also in the application fields of painting, coating and sealing where curing at room temperature is required. Hitherto in these fields, suitable organic solvents have been added to repress the crystallization, however, nonsolvent type polyurethane resins have recently been intended for preventing environmental pollution and rationalization. Under the circumstances, it has been desired for the polytetramethylene ether glycol to improve the problem of crystallization with simultaneous maintenance of the superior characteristics.

As an approach to improve the defect of the polytetramethylene ether glycol, a THF/propylene oxide copolyether polyol has been known [Journal of Polymer Science, 58, 857-863 (1962)]. However, since this polyol is a copolymer of THF with propylene oxide and so its terminal group is a secondary hydroxyl group like that of the polypropyleneoxide polyol, it is low in reactivity with an isocyanate group, and besides the resulting polyurethanes are not so superior in their properties. Thus, this polyol is a still unsatisfactory one, although it is low in the crystallizability and keeps liquid state at room temperature.

It has been found that a copolyether polyol obtained by copolymerization of THF and a 3-alkyl THF at a molar ratio of 85/15-20/80 in the presence of a strong acid catalyst maintains liquid state at room temperature, and is high in reactivity with polyisocyanates, and further that polyurethane resins comprising said polyol, a polyisocyanate and an active hydrogen atom-containing compound are superior in the rubber elasticity. The present invention is based on this finding.

The 3-alkyl substituted tetrahydrofuran used in the present invention is represented by the following general formula;

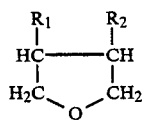

wherein one of $R_1$ and $R_2$ is hydrogen atom and another is an alkyl group of 1-4 carbon atoms.

A typical example of the 3-alkyl substituted tetrahydrofuran is 3-methyl THF, which can be synthesized by hydroformylation of 1,4-butenediol and subsequent hydrogenation thereof or reduction of itaconic acid, as disclosed in U.S. Pat. No. 3,859,369 (Copelin).

It is known that THF reacts with 3-methyl THF toward the copolymerization. The copolyether polyol in the present invention is obtained by copolymerization of THF and a 3-alkyl THF, for example, 3-methyl THF, at a molar ratio of 85/15-20/80 in the presence of a strong acid capable of causing ring-opening of THF such as, for example, chlorosulfonic acid, fluorosulfonic or perchloric acid normally at a temperature of 0° C.-50° C. This copolyether polyol has a melting point of about 10° C. or lower and maintains completely liquid state at room temperature. When the ratio of THF/3-methyl THF is lowered within the range of the above mixing molar ratio, melting point of the resulting copolyether polyol tends to lower, and so the melting point can be freely changed. Accordingly, a copolyether polyol having a melting point suitable in temperature for the object of use is readily available.

When the mixing molar ratio is smaller than 20/80, the copolyether shows substantially no melting point and abrupt high glass transition point, so that the polyol is not desired for low-temperature characteristics of polyurethane resins. When the mixing molar ratio is larger than 85/15, the crystallizability increases due to the increase in melting point and this does not achieve the object. In order to balance the crystallizability with properties of polyurethane resins, the mixing molar ratio of THF/3-methyl THF for obtaining preferred copolyether polyols are settled at 80/20-30/70, preferably.

The copolyether polyol is a colorless and transparent liquid at room temperature, and since it has a primary hydroxyl group as the terminal group, the reactivity with isocyanate group is about 3-4 times as high as that of a polypropyleneoxide polyol or a THF/propylene oxide copolyether polyol. Therefore, this copolyether polyol is suitable especially in use for room temperature curing process and further reaction injection molding (RIM) process in the field of polyurethane resins.

Molecular weight of the copolyether polyol used in the present invention is not critical and may vary in a wide range depending on the objective polyurethane resins, and suitably is 500-5000, and especially polyols of 800-4500 can exhibit conspicuous effects of the present invention.

Polyisocyanate compounds usable for the present invention are those which contain at least two isocyanate groups in the molecule, and as examples thereof, mention may be made of polyisocyanate compounds generally used for synthesis of polyurethane resins such as tolylene diisocyanate (TDI), 4,4'-diphenylmethane diisocyanate (MDI), hexamethylene diisocyanate, xylylene diisocyanate, isophorone diisocyanate, naphthylene diisocyanate and hydrogenated diphenylmethane diisocyanate. These are used alone or in combination of two or more.

The active hydrogen atom-containing compounds reactive with isocyanate group are those which have at least two hydroxyl groups or amino groups, and as examples thereof, mention may be made of those used as a chain extender used for synthesis of polyurethane resins such as ethylene glycol, propylene glycol, 1,4-butanediol, 1,6-hexanediol, xylylene glycol, glycerin, trimethylolpropane, ethylenediamine, propylenediamine, phenylenediamine, diaminodiphenylmethane and methylene bis(2-chloroaniline). Other than the above, hydrazine compounds, water and the like may also be used. Resins obtained by using diamines, hydrazines or water are polyurethane-ureas.

Polyurethane resin compositions of the present invention may be obtained by such ordinary processes for production of polyurethane resins as by the two-stage process which comprise reacting the copolyether polyol with the polyisocyanate compound to synthesize an isocyanate group-containing prepolymer and then reacting the prepolymer with the active hydrogen atom-containing compound, and by the one-shot process which comprises reacting simultaneously the copolyether polyol, the polyisocyanate and the active hydrogen atom-containing compound.

In the above synthesis, the reaction temperature varies depending on process and use of the product, but generally it is carried out at 50–200° C. In the present invention, the reaction may also be effected at lower than 50° C. because melting point of the copolyether polyol is low.

Compositional ratio of the components varies depending on the objective polyurethane resins, but the prepolymer must contain isocyanate group, and the isocyanate group in the polyisocyanate prepolymer is 1 or more, preferably 1.2 or more equivalent per 1 equivalent of hydroxyl group of the copolyether polyol. Compositional ratio of the final reactants, urethane resins, is that the total equivalent of active hydrogen atom contained in the copolyether polyol and in the chain extender is 0.9–1.1 per 1 equivalent of isocyanate group.

In the above reaction, if necessary, catalysts, stabilizers and the like may be added. The catalysts include, for example, triethylamine, tributylamine, dibutyl tin dilaurate and stannous octylate and the stabilizers include, for example, ionol (BHT), distearyl thiodipropionate, di-$\beta$-naphthylphenylenediamine and tri(dinonylphenyl)phosphite.

The polyurethane resins of the present invention are excellent elastic materials which are much superior in properties to polyurethane resins obtained with polypropyleneoxide polyols or THF/propylene oxide copolyether polyols which are liquid at room temperature, and they are nearly the same in properties as polyurethanes obtained with polytetramethylene ether polyols.

The present invention will be explained in more detail by the following examples. In these examples, hydroxyl number (OH value; mg KOH/g) of the copolyether polyol was obtained by the pyridine-acetic anhydride method, from which the number-average molecular weight was obtained. Compositional analysis and terminal hydroxyl group analysis of 3-methyl THF unit and THF unit were conducted by $^{13}$C-NMR (FX-60 manufactured by Nihon Denshi Co.), and melting point (Tm) and glass transition point (Tg) were measured by DSC (DSC-8230 manufactured by Rigaku Denki Co.). Properties of polyurethane were measured in accordance with JIS-K6301.

Example 1

In a one liter four-necked separable flask provided with a stirrer, a thermometer and an N$_2$ seal device were charged 288.4 g (4 mols) of dehydrated THF and 86.1 g (1 mol) of 3-methyl THF at a mixing molar ratio of 80/20 and thereto were added 10.5 g of 70% perchloric acid and 95 g of acetic anhydride at 10° C. Polymerization reaction was effected for 8 hours. After that, to terminate the reaction, the reaction mixture was neutralized with 500 g of 20% aqueous sodium hydroxide solution, followed by recovery of monomers, hydrolysis and purification by usual methods to obtain 275 g (yield: 73.4%) of a copolyether glycol which was colorless and transparent at room temperature. That product had a hydroxyl number of 103.9 and a number-average molecular weight of 1080. NMR analysis showed that terminal group was only primary hydroxyl group and molar ratio of THF unit and 3-methyl THF was 86/14. DSC analysis gave Tm=1° C. and Tg=−85° C.

Further, 100 g of the resulting copolyether glycol was charged in a 500 ml four-necked separable flask provided with a stirrer, a thermometer and a N$_2$ seal-pressure reducing device and was vacuum dried at 100° C. for 1 hour. Then, the dried glycol was mixed with and dissolved in 100 g of sufficiently dehydrated dimethylacetamide and a reaction with purified 4,4-diphenylmethane diisocyanate (MDI) was measured at 30° C. by known method [J. Poly. Sci. Chem. Eds., 13, 1657 ('75)] to obtain the reaction rate constant $K_1=4.3\times10^{-3}$ (Kg/eg. sec). The value was about 4 times that of THF/propylene oxide copolyether glycol (molecular weight 980, $K_1=1.2\times10^{-3}$) and that of polypropyleneoxide glycol (molecular weight 1000, $K_1=0.9\times10^{-3}$) were measured in the same manner as the above.

Then, 200 g of said copolyether polyol was charged in the similar 500 ml separable flask and was vacuum dried at 100° C. for 1 hour. Thereafter, 106 g of MDI was added thereto and reaction was effected at 60° C. for 5 hours to obtain a prepolymer (NCO=6.50%). In another mixer, 150 g of the prepolymer was taken and deaerated, and thereto was added 10 g of 1,4-butanediol followed by well mixing for several minutes. Thereafter, the mixture was poured in a glass mold of 20 cm×30 cm×0.2 cm and subjected to curing in an oven of 110° C. for 16 hours to obtain a polyurethane sheet. The sheet was left to stand in a constant temperature chamber of 20° C. for 1 week and measured its properties. Properties of the prepolymer and the polyurethane are shown in Table 1.

Examples 2–4 and Comparative Examples 1 and 2

Copolyether glycols and polyurethanes were prepared in the same manner as in Example 1 except that the mixing molar ratio of THF and 3-methyl THF was 50/50 (Example 2), 30/70 (Example 3), 90/10 (Comparative Example 1), 10/90 (Comparative Example 2) or 80/20 (molecular weight 2000, Example 4) and amount of perchloric acid/acetic anhydride was changed depending on the desired molecular weights. Properties of the resulting copolyether glycol and polyurethane are shown in Table 1.

Comparative Examples 3 and 4

Properties of commercially available polytetramethylene ether glycol (PTG, molecular weight 1020), THF/propylene oxide (30 wt%) copolyether glycol (PPTG, molecular weight 980) and polyurethane obtained in the same manner as in Example 1 are shown in Table 1.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Monomer ratio (THF/3 - methyl THF) | 80/20 | 50/50 | 30/70 | 80/20 | 90/10 | 10/90 | [PTG] | [PPTG] |

TABLE 1-continued

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Polyol |  |  |  |  |  |  |  |  |
| Molecular weight | 1080 | 1100 | 900 | 1950 | 1020 | 820 | 1020 | 980 |
| Composition (THF/3 - methyl THF) | 86/14 | 65/35 | 45/55 | 85/15 | 91/9 | 30/70 | 100/0 | PO = 30% |
| DSC |  |  |  |  |  |  |  |  |
| (Tm °C.) | 1 | −20 | none | 5 | 18 | none | 28 | none |
| (Tg °C.) | −85 | −84 | −82 | −86 | −86 | −75 | −88 [MW 10,000] | −78 |
| Prepolymer |  |  |  |  |  |  |  |  |
| NCO (wt %) | 6.50 | 6.53 | 6.48 | 6.72 | 6.46 | — | 6.46 | 6.49 |
| Polyurethane* |  |  |  |  |  |  |  |  |
| Hardness (JIS A) | 88 | 87 | 89 | 88 | 88 | — | 88 | 80 |
| $M_{100}$ (kgf/cm$^2$) | 70 | 69 | 80 | 62 | 72 | — | 75 | 50 |
| $M_{300}$ (kgf/cm$^2$) | 140 | 138 | 170 | 126 | 145 | — | 150 | 119 |
| Tensile strength at breaking (kgf/cm$^2$) | 460 | 510 | 520 | 410 | 450 | — | 440 | 300 |
| Elongation at breaking (%) | 540 | 490 | 450 | 600 | 480 | — | 500 | 700 |
| Tear strength (kgf/cm) | 81 | 80 | 78 | 86 | 81 | — | 84 | 70 |
| DSC (Tg °C.) | −50 | −49 | −45 | −69 | −52 | — | −53 | −41 |

*JIS K6301: Tension test No. 3 dumbbell
Tear test B type dumbbell

We claim:

1. A polyurethane resin composition which comprises a copolyether polyol liquid at room temperature having a primary hydroxyl group as a terminal group obtained by the copolymerization of tetrahydrofuran and a 3-alkyl tetrahydrofuran at a mixing molar ratio of 85/15–20/80, a polyisocyanate compound and an active hydrogen atom-containing compound reactive with isocyanate group.

2. A polyurethane resin composition according to claim 1 wherein the 3-alkyl tetrahydrofuran is represented by the formula:

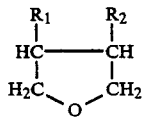

wherein one of $R_1$ and $R_2$ is hydrogen atom and another is an alkyl group of 1–4 carbon atoms.

3. A polyurethane resin composition according to claim 1 wherein the 3-alkyl tetrahydrofuran is 3-methyl tetrahydrofuran.

4. A polyurethane resin composition according to claim 1 wherein the copolymerization of tetrahydrofuran and 3-alkyl tetrahydrofuran is carried out in the presence of a strong acid catalyst.

5. A polyurethane resin composition according to claim 1 wherein the copolyether polyol has a molecular weight of 500–5000.

6. A polyurethane resin composition according to claim 1 wherein the active hydrogen atom-containing compound has at least two hydroxyl groups or amino groups.

7. A process for production of a polyurethane resin which comprises reacting a copolyether polyol liquid at room temperature having a primary hydroxyl group as a terminal group obtained by copolymerization of tetrahydrofuran and a 3-alkyl tetrahydrofuran at a mixing molar ratio of 85/15–20/80, a polyisocyanate compound and an active hydrogen atom-containing compound reactive with isocyanate group.

8. A process according to claim 7 wherein the 3-alkyl tetrahydrofuran is represented by the formula:

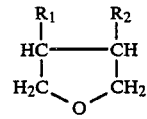

wherein one of $R_1$ and $R_2$ is hydrogen atom and another is an alkyl group of 1–4 carbon atoms.

9. A process according to claim 7 wherein the 3-alkyl tetrahydrofuran is 3-methyl tetrahydrofuran.

10. A process according to claim 7 wherein the copolymerization of tetrahydrofuran and 3-alkyl tetrahydrofuran is carried out in the presence of a strong acid catalyst.

11. A process according to claim 7 wherein the copolyether polyol has a molecular weight of 500–5000.

12. A process according to claim 7 wherein the active hydrogen atom-containing compound has at least two hydroxyl groups or amino groups.

13. A process according to claim 7 which comprises reacting the copolyether polyol with the polyisocyanate compound to produce a prepolymer having isocyanate group and then reacting the prepolymer with the active hydrogen atom-containing compound.

14. A process according to claim 7 which comprises simultaneously reacting the copolyether polyol, the polyisocyanate compound and the active hydrogen atom-containing compound.

* * * * *